Figure 1:
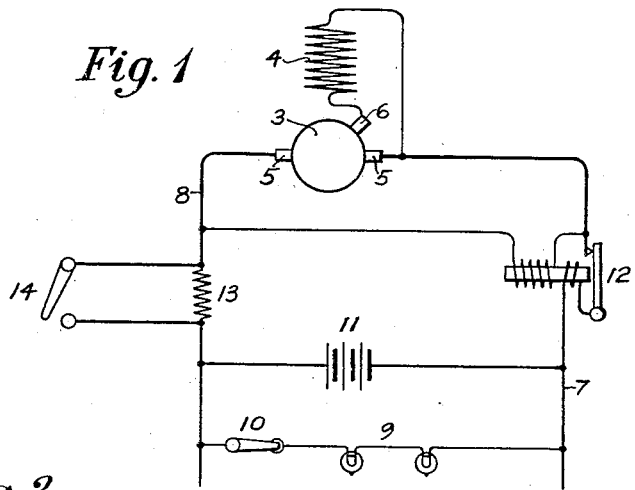

E. P. LEE.
ELECTRIC SYSTEM.
APPLICATION FILED OCT. 17, 1919.

1,395,504.

Patented Nov. 1, 1921.

INVENTOR- Earle P. Lee
BY
Farnum F. Dorsey
HIS ATTORNEY

UNITED STATES PATENT OFFICE.

EARLE P. LEE, OF ROCHESTER, NEW YORK, ASSIGNOR TO NORTH EAST ELECTRIC COMPANY, OF ROCHESTER, NEW YORK, A CORPORATION OF NEW YORK.

ELECTRIC SYSTEM.

1,395,504.   Specification of Letters Patent.   Patented Nov. 1, 1921.

Application filed October 17, 1919. Serial No. 331,295.

*To all whom it may concern:*

Be it known that I, EARLE P. LEE, a citizen of the United States, residing at Rochester, in the county of Monroe and State of New York, have invented certain new and useful Improvements in Electric Systems; and I do hereby declare the following to be a full, clear, and exact description of the invention, such as will enable others skilled in the art to which it appertains to make and use the same.

This invention relates to electric systems of the type commonly used on motor-cars or other vehicles, wherein a secondary battery is charged by a generator which is driven at a speed varying with the speed of the vehicle or of the engine which drives it.

To control the out-put of the generator in such a system it is common to provide the generator with a shunt field-winding energized by connection with one or more supplementary brushes which engage the commutator at points differing substantially in potential from the points engaged by the main brushes. This arrangement has the effect, as is well known, of producing a current-output from the generator which rises rapidly up to a certain critical speed, and then falls off more slowly as the speed is further increased.

While the arrangement just described gives an output which approximates roughly to the requirements of the battery and of the lamps or other load carried by the battery, it is desirable to provide for adjustment to compensate for unusual or extreme variations in the conditions of use. For example, where an automobile so equipped is used chiefly at night, running at low speed and with lights burning, the generator should be set for a comparatively high output; whereas, if the apparatus, with the same adjustment, were used for touring in the daytime the battery would receive an objectionably heavy overcharge.

The object of the present invention is to provide a system, of the type in question, with simple and convenient means whereby the user may adjust the output of the generator at will and without the necessity of direct access to the generator, and more particularly, to accomplish this result by means requiring only electrical connection with the generator and the other parts of the system, so that the adjustment may be accomplished by a circuit-controller which may be located at any convenient point.

In accordance with the present invention the foregoing objects are attained by the use of a resistance-device, with means for throwing it into and out of the circuit connecting the generator with the battery. While the output of the generator is changed by this operation, if the resistance is of the proper amount, within rather wide limits, the change, is in the opposite direction to that which would be naturally expected; when the resistance is introduced into the circuit the out-put is increased and a heavier charging-current passes through the battery, while the reverse occurs when the resistance is removed. This peculiar result is due to the fact that the direct tendency of the resistance to cut down the current in the charging-circuit is more than counterbalanced by the fact that the E. M. F. across the shunt-winding of the generator is increased, which results in an increase in the terminal voltage of the generator sufficient to more than compensate for the increased resistance in the load-circuit.

Figure 2:
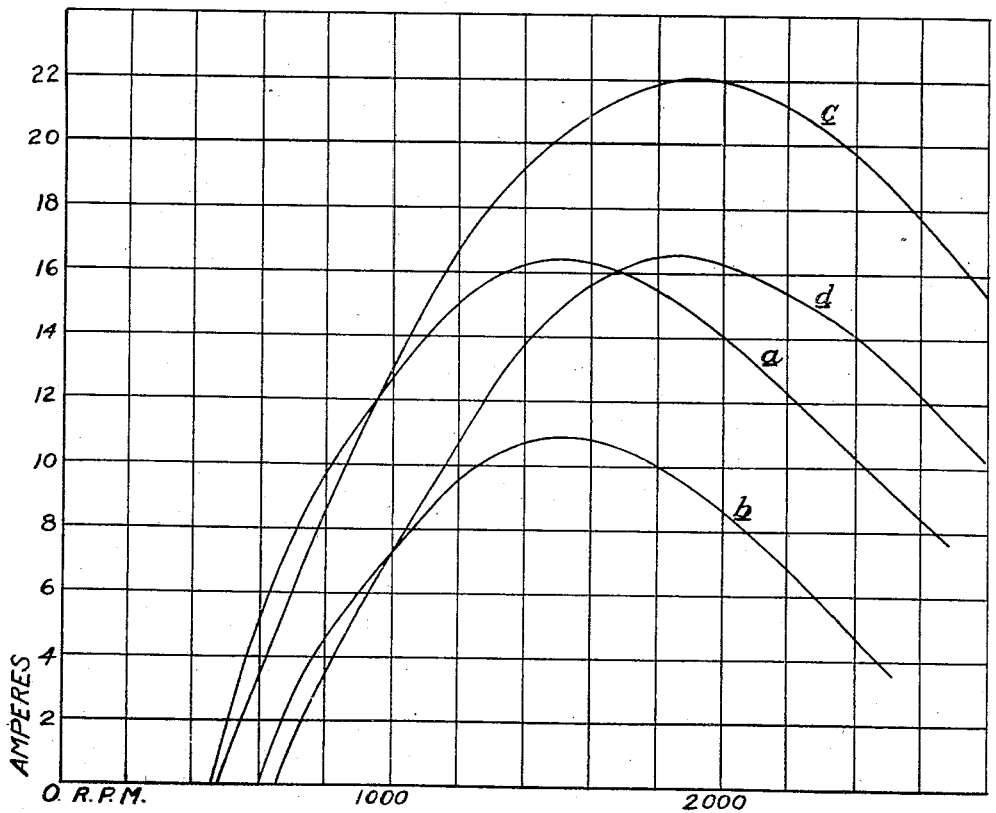

In the accompanying drawings Figure 1 is a diagram of an electric lighting system embodying the present invention, and Fig. 2 is a diagram showing graphically the operation of an actual embodiment of the invention.

In the diagram Fig. 1 the generator 3 has a shunt-winding 4, of which one end is connected to one of the main brushes 5, while the other end is connected to the third brush 6. The generator is connected with two current mains 7 and 8, and a lighting-circuit 9 is connected across these mains and controlled by a switch 10. The battery 11 is "floated on the line" in the usual manner, by connection across the mains. The usual reverse-current cut-out 12 is interposed in the main 7.

The resistance-device characteristic of the present invention is shown at 13, and this device is bridged by a shunt-circuit which is controlled by a switch 14.

The switch 14 may be located at any conveniently accessible point, and the charging rate may be increased by opening this switch, or decreased by closing it, thus throwing the resistance-device into or out of effective operation.

Fig. 2 shows the results secured with a 6- volt generator of a conventional type, the resistance used being .1575 ohm and the lamp-load comprising two 15 c. p. and two 2 c. p. tungsten lamps of the type used on motor-vehicles.

With the resistance out of use, and the lamps turned on, the total output of the generator is shown by the curve $a$, and the curve $b$ shows the amount of current available to charge the battery, the difference between these curves being the current consumed in the lamps. With the resistance in use, the total output is shown by the curve $c$, and the battery-charging current by the curve $d$.

From the curves given it may be seen that at all speeds above 1000 R. P. M. the use of the resistance increased the total output of the generator and the volume of battery-charging current. It will also be seen that above speeds of about 1700 R. P. M. the use of the resistance more than compensates for the lamp-load: i. e., the battery-charging current with the lamps burning, as shown by the curve $d$, is greater than the total output with the lamps off and the resistance not in use, as shown by the curve $a$.

As shown by a comparison of the curves $a$ and $c$ or the curves $b$ and $d$, the introduction of the resistance makes no sensible difference in the out-put of the generator at a speed of about 1000 R. P. M., and at lower speeds it even causes a slight diminution of output. This effect is of no practical consequence, however, because it is negligible in degree and it occurs at a speed below the ordinary running speed of the engine.

While the invention has been described specifically and illustrated in Fig. 2 as used to compensate for a lamp-load, it will be apparent that the resistance may be used to adjust the generator to other conditions, and that the invention is not limited to the use of any specific amount of resistance, the only limitations in this respect being that the resistance should not be so great as to neutralize the effect of the increased voltage effective on the shunt field-winding.

The invention claimed is:

1. An electric system comprising: an electric generator provided with main brushes, a supplementary brush, and a shunt field-winding fed from the supplementary brush; a storage-battery connected in a charging-circuit with the main brushes of the generator; and means for throwing into and out of the charging circuit a resistance of an amount such that the resulting increase in the terminal voltage of the generator more than compensates for the increase in the resistance of the charging-circuit.

2. An electric system comprising: an electric generator provided with main brushes, a supplementary brush, and a shunt field-winding connected between the supplementary brush and one of the main brushes; a storage battery connected in a charging-circuit with the main brushes of the generator; a lamp-load with means for throwing it into and out of connection with the battery; and means, remote from the generator, for throwing into and out of the charging-circuit a resistance sufficient to compensate, through the resulting enhanced voltage at the generator-terminals, for both the lamp-load and the increased resistance in the charging-circuit.

EARLE P. LEE.